US010015011B2

(12) United States Patent
Boutros et al.

(10) Patent No.: US 10,015,011 B2
(45) Date of Patent: Jul. 3, 2018

(54) APPARATUS AND METHOD FOR SECURE COMMUNICATION ON A COMPOUND CHANNEL

(71) Applicant: QATAR FOUNDATION FOR EDUCATION, SCIENCE AND COMMUNITY DEVELOPMENT, Washington, DC (US)

(72) Inventors: Joseph Jean Boutros, Doha (QA); Volkan Dedeoglu, Doha (QA); Matthieu R. Bloch, Atlanta, GA (US)

( * ) Notice: Subject to any disclaimer, the term of this patent is extended or adjusted under 35 U.S.C. 154(b) by 0 days.

(21) Appl. No.: 15/121,376

(22) PCT Filed: Feb. 24, 2015

(86) PCT No.: PCT/US2015/017237
§ 371 (c)(1),
(2) Date: Aug. 24, 2016

(87) PCT Pub. No.: WO2015/127426
PCT Pub. Date: Aug. 27, 2015

(65) Prior Publication Data
US 2016/0365977 A1 Dec. 15, 2016

Related U.S. Application Data

(60) Provisional application No. 61/943,544, filed on Feb. 24, 2014.

(51) Int. Cl.
*H04K 1/00* (2006.01)
*H04L 9/32* (2006.01)
(Continued)

(52) U.S. Cl.
CPC .......... *H04L 9/3215* (2013.01); *H03M 13/05* (2013.01); *H04L 9/085* (2013.01); *H03M 13/1102* (2013.01); *H04L 2209/34* (2013.01)

(58) Field of Classification Search
CPC ..... H04L 9/3215; H04L 9/085; H04L 9/0888; H04L 2209/34; H04L 63/16;
(Continued)

(56) References Cited

U.S. PATENT DOCUMENTS 8,225,173 B2   7/2012  Shasha
2004/0096058 A1  5/2004  Cho et al.
(Continued)

FOREIGN PATENT DOCUMENTS

WO   WO 02089096   11/2002

*Primary Examiner* — Fatoumata Traore
*Assistant Examiner* — Trong Nguyen
(74) *Attorney, Agent, or Firm* — Richard C. Litman (57) ABSTRACT

The anti-diversity concept for secure communication on a two-link compound channel provides secure communication over two parallel communication channels. The message is split into two separate bit sequences by a source splitter. An error correction encoder (110) is applied to the two bit sequences to provide two code words for two channels (122, 124), such that left and right halves of an error correction code matrix respectively corresponds to the two parallel signal channels (122, 124). For the left half of the error correction code matrix, an upper left matrix block is a random permutation matrix, an upper right block is the identity matrix, and the bottom right matrix block is a random matrix of column and row weight greater than or equal to one. The bottom left matrix block is a column permutation of the bottom right, random matrix block. The right half error correction code matrix is a similar, symmetric structure.

11 Claims, 7 Drawing Sheets

(51) Int. Cl.
*H04L 9/08* (2006.01)
*H03M 13/05* (2006.01)
*H03M 13/11* (2006.01)

(58) Field of Classification Search
CPC ............ H04L 29/06945; H03M 13/05; H03M 13/1102; H03M 13/616; H03M 13/6569
See application file for complete search history.

(56) References Cited

U.S. PATENT DOCUMENTS

| | | | |
|---|---|---|---|
| 2008/0270867 A1* | 10/2008 | Chung | H03M 13/03 714/752 |
| 2009/0094499 A1 | 4/2009 | Deoka | |
| 2009/0106625 A1* | 4/2009 | Jun | G11B 20/18 714/758 |
| 2011/0131462 A1 | 6/2011 | Gunnam | |
| 2012/0051544 A1* | 3/2012 | Liu | H04W 12/02 380/270 |
| 2012/0089884 A1* | 4/2012 | Kamiya | H03M 13/116 714/752 |
| 2013/0275827 A1 | 10/2013 | Wang et al. | |

* cited by examiner

APPARATUS AND METHOD FOR SECURE COMMUNICATION ON A COMPOUND CHANNEL

TECHNICAL FIELD

The present invention relates to apparatus and methods for secure communication, and particularly to stochastic and non-stochastic digital signal processing (DSP) to provide secure communications over a compound channel as can be based on a diversity deficient low-density parity check (LDPC) or an adjunction of a random sequence.

BACKGROUND ART

Transmission of confidential messages can be vulnerable to security attacks. In passive security attacks, an eavesdropper can listen to the transmission between the transmitter and a legitimate receiver of the transmitted information to reveal the confidential message being transmitted. Various cryptographic encryption schemes have been used to achieve confidentiality. However, use of such cryptographic encryption schemes typically requires generation, distribution and management of keys to encrypt the confidential message.

Applications of a wiretap channel model to physical-layer security have been considered, but relatively few constructive and low complexity coding schemes have been developed. Also, recent efforts exploiting powerful families of error-control codes have met some success in certain cases. For instance, low-density parity check codes (LDPC) have been shown to provide secrecy over erasure channels, while Polar codes and invertible extractors have been proven to ensure secrecy over some symmetric channels. Various results also suggest the usefulness of LDPC codes and lattice codes over a Gaussian wiretap channel. However, such constructions typically only apply to memoryless wiretap channels with full statistical knowledge of the eavesdropper's channel, which can limit their scope of applications.

In this regard, secure communication schemes that utilize the difference between the channel conditions of the legitimate users and eavesdroppers have been proposed. However, with various secure communication schemes, an eavesdropper can have access to only one of two parallel links for the secure communication.

Thus, it is desirable that a secure communication scheme provide for secure communications of information over a compound channel as can provide another level of security in the physical layer as can be over that of existing cryptographic security mechanisms in the application layer.

Further, it is desirable that a secure communication scheme provide for secure communications of information by a coding scheme that provides secrecy over a compound wiretap channel in which an eavesdropper can only observe one of two channels.

Thus, an encryption apparatus and method for secure communication solving the aforementioned problems is desired.

DISCLOSURE OF INVENTION

An encryption method for secure communication includes dividing a message into first and second bit sequences with a source splitter and error correction encoding each of the first and second bit sequences to generate an error correction code matrix. A left half of the error correction code matrix corresponds to a first signal channel and a right half of the error correction code matrix corresponds to a second signal channel.

In the error correction code matrix, the upper left matrix block of the left half of the error correction code matrix is a random permutation matrix, an upper right block of the left half of the error correction code matrix is an identity matrix, a bottom right matrix block of the left half of the error correction code matrix is a random matrix of column and row weight greater than or equal to one, and a bottom left matrix block of the left half of the error correction code matrix is a column permutation of the bottom right random matrix block of the left half of the error correction code matrix, and the left half of the error correction code matrix having first and second checknodes.

Switching the first and second checknodes of the left half of the error correction code matrix is performed and the right half of the error correction code matrix is generated from the left half of the error correction code matrix following the switching of the first and second checknodes thereof. The error correction encoded first and second bit sequences are respectively transmitted over the first and second signal channels.

The source splitter can be a stochastic source splitter, such that a zero sequence is applied to the message as the message is input into the stochastic source splitter and a random sequence is mixed with the first and second bit sequences output from the stochastic source splitter. The source splitter can also be a non-stochastic source splitter to divide a message into the first and second bit sequences.

An encryption method for secure communication can further include the message being divided into a plurality of bit sequences greater than or equal to two and a plurality of signal channels greater than or equal to two corresponding to the plurality of bit sequences as can further enhance security of the message transmission, such as two or three bit sequences or two or three signal channels, for example.

As such, embodiments of an encryption method for secure communication can include a source splitter to divide a message into a plurality of bit sequences and error correction encoding each of the plurality of bit sequences to generate an error correction code matrix. The error correction code matrix includes a plurality of portions including submatrices, and a first portion of the error correction code matrix corresponds to a first signal channel of the plurality of signal channels and the one or more other portions of the error correction code matrix respectively correspond to the one or more other signal channels of the plurality of signal channels.

An upper left matrix block of the first portion of the error correction code matrix is a random permutation matrix, an upper right block of the first portion of the error correction code matrix is an identity matrix, a bottom right matrix block of the first portion of the error correction code matrix is a random matrix of column and row weight greater than or equal to one, and a bottom left matrix block of the first portion of the error correction code matrix is a column permutation of the bottom right random matrix block of the first portion of the error correction code matrix.

The first portion of the error correction code matrix has a plurality of checknodes, and the plurality of checknodes of the first portion of the error correction code matrix are switched and the one or more other portions of the error correction code matrix are generated based on the first portion of the error correction code matrix following the switching of the plurality of checknodes thereof. The error correction encoded plurality of bit sequences respectively is transmitted over the corresponding plurality of signal channels.

Also, an encryption apparatus for secure communication includes a source splitter to divide a message into first and second bit sequences. An error correction encoder receives the first and second bit sequences from the source splitter and applies and error correction encoding to each of the first and second bit sequences to generate an error correction code matrix, wherein a left half of the error correction code matrix corresponds to a first signal channel and a right half of the error correction code matrix corresponds to a second signal channel.

In the generated error correction code matrix, an upper left matrix block of the left half of the error correction code matrix is a random permutation matrix, an upper right block of the left half of the error correction code matrix is an identity matrix, a bottom right matrix block of the left half of the error correction code matrix is a random matrix of column and row weight greater than or equal to one, and a bottom left matrix block of the left half of the error correction code matrix is a column permutation of the bottom right random matrix block of the left half of the error correction code matrix, and the left half of the error correction code matrix having first and second checknodes.

The error correction encoder switches the first and second checknodes of the left half of the error correction code matrix and generates the right half of the error correction code matrix from the left half of the error correction code matrix following the switching of the first and second checknodes thereof to provide error correction encoded first and second bit sequences to be respectively transmitted over the first and second signal channels to a receiver.

Embodiments of an encryption apparatus for secure communication can further include a source splitter to divide the message into a plurality of bit sequences greater than or equal to two and an error correction encoder that receives the plurality of bit sequences from the splitter and applies error correction encoding to each of the plurality of bit sequences to generate an error correction code matrix for error correction encoding each of the plurality of bit sequences as can be transmitted over or on a plurality of signal channels greater than or equal to two corresponding to the plurality of bit sequences, as can further enhance security of the message transmission, such as two or three bit sequences or two or three signal channels, for example.

These and other features of the present invention will become readily apparent upon further review of the following specification and drawings.

BRIEF DESCRIPTION OF THE DRAWINGS

Similar reference characters denote corresponding features consistently throughout the attached drawings.

BEST MODE(S) FOR CARRYING OUT THE INVENTION

Embodiments of apparatuses and methods for secure communication of transmitted messages, as can include information or data, over a two-link compound channel can be implemented by a non-stochastic scheme and a stochastic scheme. The non-stochastic scheme is based on diversity deficient LDPC ensembles and a non-stochastic source splitter. The stochastic scheme is built from a stochastic source splitter, as can be the same or a similar splitter as the non-stochastic source splitter, but with adjunction of a random sequence. The coding structures in the non-stochastic scheme can achieve security in the message transmission in an algebraic sense, and the stochastic scheme can achieve security in the message transmission in an information-theoretic sense.

Also, the compound channel in embodiments of apparatuses and methods for secure communication of transmitted messages can include a plurality of links greater than or equal to two links, for example, and should not be construed in a limiting sense. Adding such additional links, such as three links as discussed herein in relation to FIG. 5B can enhance message, such as information and data, security for the secure transmission.

The anti-diversity concept for secure communication on a two-link compound channel is an encryption method for secure communication over two parallel communication channels. The individual bits of the encrypted message can only be recovered from both channels together, thus someone who intercepts only a single one of the channels will likely not be able to decrypt the message. The original message is split into two separate bit sequences by a source splitter.

An error correction encoder is applied to the two bit sequences, such that left and right halves of an error correction code matrix respectively correspond to the two parallel signal channels. For the left half of the error correction code matrix, an upper left matrix block is a random permutation matrix, an upper right block is the identity matrix, and the bottom right matrix block is a random matrix of column and row weight greater than or equal to one. The bottom left matrix block is a column permutation of the bottom right, random matrix block. The right half of the error correction code matrix is a similar, symmetric structure. The error correction encoder produces two code words sent on the two separate channels.

Figure 1:
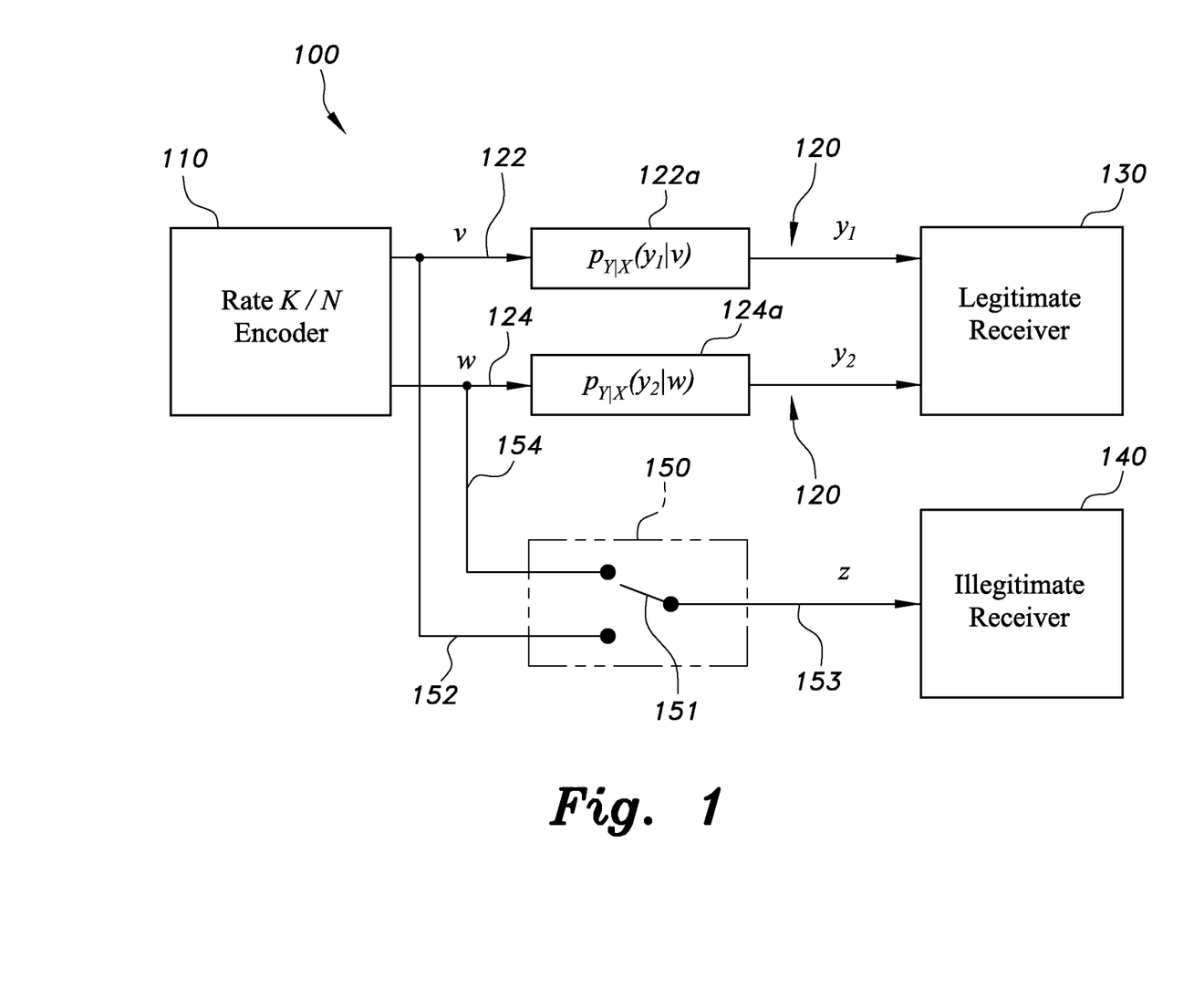
FIG. 1 is a schematic diagram of an embodiment of a two-link compound channel secure communication system to transmit a secure message according to the present invention.

Referring to FIG. 1 there is illustrated a schematic diagram of an embodiment of a two-link compound channel secure communication system 100 to transmit a secure message. In the secure communication system 100, an encoder 110, as can include a transmitter/receiver to transmit and receive a message, such as including information or data, receives two separate bit sequences from a source splitter and provides error correction encoded first and second bit sequences to a two-link compound channel 120 having a first signal channel 122 and a second signal channel 124.

The error correction encoded first and second bit sequences are respectively transmitted on the first signal channel 122 and the second signal channel 124 to a legitimate receiver 130, as can also include a transmitter/receiver, when can then decode the securely transmitted message, for example. An illegitimate receiver 140 that can only observe one of the two channels 122 or 124, such as by selectively receiving a bit sequence over a communication line 152 from the first signal channel 122 or receiving a bit sequence over communication line 154 from the second signal channel 124. The communication lines 152 and 154 communicating with a signal channel selector 150 that has a selection switch 151, for example, to select one of the first or second signal channels 122 or 124 to be observed.

The illegitimate receiver 140 communicates with the signal channel selector 150 over a communication line 153 to select the observed channel and received the observed bit sequence. The illegitimate receiver 140 being only able to observe one of the first or second signal channels 122 or 124 cannot therefore decode the secure message in embodiments of apparatus and methods for secure communication, thereby maintaining the integrity and security of the transmitted message. A link 122a corresponding to the first channel 122 and a link 124a corresponding to the second channel 124 of the two link compound channel 120 are defined by pY|X and are identical or substantially identical, for example.

As illustrated in FIG. 1, the compound channel 120 has two identical links defined by their transition probabilities $p_Y|x(y_1|v)$ and $p_Y|x(y_2|w)$, respectively. These two links can be any binary memoryless symmetric (BMS) channel, v, w $\in \mathbb{F}_2^{N/2}$ and $y_1, y_2 \in \mathcal{Y}^{N/2}$ where $\mathcal{Y}$ is the output alphabet as observed by the legitimate receiver 130. It can be assumed that a uniform binary source produces K binary elements. The length-N codeword generated by a rate-K/N binary encoder, such as encoder 110 is divided into parts v and w to be respectively transmitted in parallel, such as over the first and second signal channels 122 and 124. For the sake of simplifying the notations, a unique letter is used to denote a random variable and any given value taken by that random variable, for example, and the appropriate connotation can be discerned from the context herein.

Regarding the eavesdropper, such as the illegitimate receiver 140, an exemplary worst case scenario can be considered. In the scenario, let the channel between the encoder 110 and the illegitimate receiver 140 have an output $z \in \mathbb{F}_2^{N/2}$. The illegitimate receiver 140 is reading a noiseless copy of one of the two links, i.e. z=v or z=w. While assuring that the legitimate receiver 130 has a relatively excellent performance as to reception and decoding of the secure message, embodiments of an encryption apparatus and method for secure communication can prevent or substantially prevent the illegitimate receiver 140 from determining the source bits, part of the source bits, or any information derived from the source bits. Let $M=(a_1, a_2, \ldots, a_K) \in \mathbb{F}_2^K$ be the source message. In embodiments of an encryption apparatus and method for secure communication, two types of security are considered, namely algebraic security such as can be implemented in a non-stochastic DSP structure for secure communication, and information theoretic security, such as can be implemented in a stochastic DSP structure for secure communication, for example.

With reference generally to FIG. 1 and the encryption apparatus 100, embodiments of a stochastic DSP structure for secure communication generally include two main blocks. First, the confidential message is split into two bit sequences by using a stochastic source splitter. The stochastic source splitter can be constructed with the adjunction of a zero sequence, which is applied at the input of the splitter, and a random sequence, which is mixed with the output of the splitter, as herein described. The splitter divides the message into bit sequences so that an eavesdropper, such as the illegitimate receiver 140, cannot get any useful information about the original message by observing one of the two parallel links. Then, an error correction encoder, such as encoder 110, is applied to the two bit sequences, which are the outputs of the source splitter. The error correction code can be based, for example, on a matrix which has 2×4 building blocks. The left and the right halves of the matrix can correspond to the two parallel links, and each half can include 2×2 building blocks. For the left half of the matrix, the upper left building block is the random permutation matrix A, the upper right is the identity matrix I, and the bottom right is the random matrix S of column and row weight greater than or equal to 1. The bottom left building block C is generated such that C=SA, i.e., C can be a column permutation of S. By symmetry, the right half of the matrix can have the same or substantially the same structure with appropriate arrangement of the building blocks, for example.

Again, with reference generally to FIG. 1 and the encryption apparatus 100, embodiments of a non-stochastic DSP structure for secure communication generally includes two main blocks. First, the confidential message is split into two bit sequences by using a source splitter. The splitter divides the message into bit sequences so that an eavesdropper, such as the illegitimate receiver 140, does not have access to the confidential message bits directly. Then, an error correction encoder, such as encoder 110, is applied to the two bit sequences, which are the outputs of the source splitter. The encoding structure in the non-stochastic DSP structure can provide algebraic security in that the individual binary bits of the confidential message can be recovered only when the two parallel links are observed together. The error correction code can be based on a matrix which has 2×4 building blocks. The left and the right halves of the matrix correspond to the two parallel links, and each half can include 2×2 building blocks. For the left half of the matrix, the upper left building block is the random permutation matrix A, the upper right is the identity matrix I, and the bottom right is the random matrix S of column and row weight greater than or equal to 1. The bottom left building block C is generated such that C=SA, i.e., C is a column permutation of S. By symmetry, the right half of the special matrix can have the same or substantially the same structure with appropriate arrangement of the building blocks, for example.

Also, the encoding structure in the non-stochastic structure can provide algebraic secrecy of the individual bits of a confidential message without using a key-based encryption, for example. The encoder can be based on the anti-diversity concept, and combines, for example, a source splitter and an error correction encoder as can enable transmission of a confidential message without substantial bit leakage for a two-link compound channel.

In embodiments of both the stochastic DSP structure and the non-stochastic DSP structure for secure communication, the error correction encoder, such as the encoder 110, can produce two codewords to be sent on the two parallel links. Having access to the noisy outputs of the two parallel links, the legitimate receiver 130 can recover the confidential message. Whereas, the eavesdropper, such as the illegitimate receiver 140, who has access to only one of the two parallel links cannot reveal any information about the confidential message in the algebraic sense or the information-theoretic sense.

In applying algebraic security, such as in embodiments of the non-stochastic structure, given z, the illegitimate receiver 140 must not be able to find the value of an individual binary element $a_i$, $\forall_i = 1 \ldots K$. This algebraic security can be achieved by the means of a non-stochastic LDPC encoder and a weight-2 splitter, in embodiments of an encryption apparatus and method for secure communication, as described herein.

On the other hand, in applying information theoretic security, a system design for secure communication must typically guarantee a zero or substantially zero leakage, i.e. zero mutual information $I(M; z)=0$ or, equivalently $H(M|z) = H(M)$. This perfect or substantially perfect secrecy can be achieved via a stochastic encoding including a random sequence in embodiments of an encryption apparatus and method for secure communication, as described herein.

In anti-diversity LDPC encoding, as can be implemented in non-stochastic DSP structures in embodiments of an encryption apparatus and method for secure communication, LDPC codes and diversity methods for fading channels are considered. The compound channel with two parallel links typically can be very similar to block fading channels. On a double diversity fading channel, channel coding is supposed to exhibit an error rate performance $P_e$ proportional to $1/\gamma^2$ at a high signal-to-noise ratio $\gamma$. In such a case, the channel code is said to be a full-diversity code. An example of full-diversity code ensemble is the Root-LDPC ensemble.

In coding for double diversity on block fading channels, three fundamental rules generally should be satisfied. In this regard, the coding rate R typically must satisfy $R \leq 1/2$. For example, the parity-check matrix can be divided into two equal size sub-matrices, $H=[H_1|H_2]$. Under Maximum-Likelihood (ML) decoding, $H_1$ and $H_2$ must have full rank. Under iterative message-passing decoding, information bits must be connected to root checknodes of an order one or higher, for example.

However, security typically cannot be achieved with a full-diversity code on the two-link compound channel. Double diversity can let the illegitimate receiver 140 determine the missing link and hence all source bits will likely be revealed. Therefore, the LDPC code design for security should not satisfy the rules listed above.

In embodiments of an encryption apparatus and method for secure communication, the anti-diversity concept relates to a code design where the three fundamental diversity rules are intentionally violated. The LDPC code constructed via an anti-diversity concept can be referred to as an anti-root LDPC. To briefly describe the structure of an anti-root LDPC, let K/N be the design rate (where R is the effective rate), then $(1/2) \leq (K/N) \leq R<1$. The N binary digits of a codeword are divided into four families, namely $1i$, $1p$, $2i$, and $2p$, for example. In this regard, family of K/2 information digits $1i$ and a family of (N−K)/2 parity digits $1p$ are to be sent on the first link. Similarly, the two families $2i$ and $2p$ are to be sent on the second link. The design rate K/N is taken in the range [1/2, 1). In the special case of (K/N)=1/2, a deficient diversity can be typically assured by the last two rules.

In this regard, let $H_1$, the left half part of H be written as a block matrix as in the following relation (1):

$$H_1 = \begin{bmatrix} A_1 & B_1 \\ C_1 & S_1 \end{bmatrix} \tag{1}$$

Referring to relation (1), the submatrix $A_1$ of size $(N-K)/2 \times K/2$ corresponds to edges connecting bitnodes $1i$ to a first type of checknodes $1c$. The submatrix $B_1$ of square size $(N-K)/2 \times (N-K)/2$ corresponds to edges connecting bitnodes $1p$ to the first type of checknodes $1c$. In a similar fashion, $C_1$ and $S_1$ have the same size as $A_1$ and $B_1$ respectively. $C_1$ and $S_1$ define edges from $1i$ and $1p$ to the second type of checknodes $2c$. Under iterative decoding, parity bits are connected to all checknode types, i.e., $B_1$ and $B_2$ are non-zero submatricies, for example. Under ML decoding, $H_1$ and $H_2$ typically must be rank deficient, i.e., $\det(H_1)=0$ and $\det(H_2)=0$, for example. Now, the third rule is violated by taking $B_1 = B_2 = I$, where I is the identity matrix of size $(N-K)/2$. In the special case K/N=1/2, $A_1$ and I commute, then as in the following relations (2A) and (2B):

$$\det(H_1) = \det(C_1 + S_1 A_1), \text{ and} \tag{2A}$$

$$\det(H_2) = \det(C_2 + S_2 A_2). \tag{2B}$$

Figure 2:
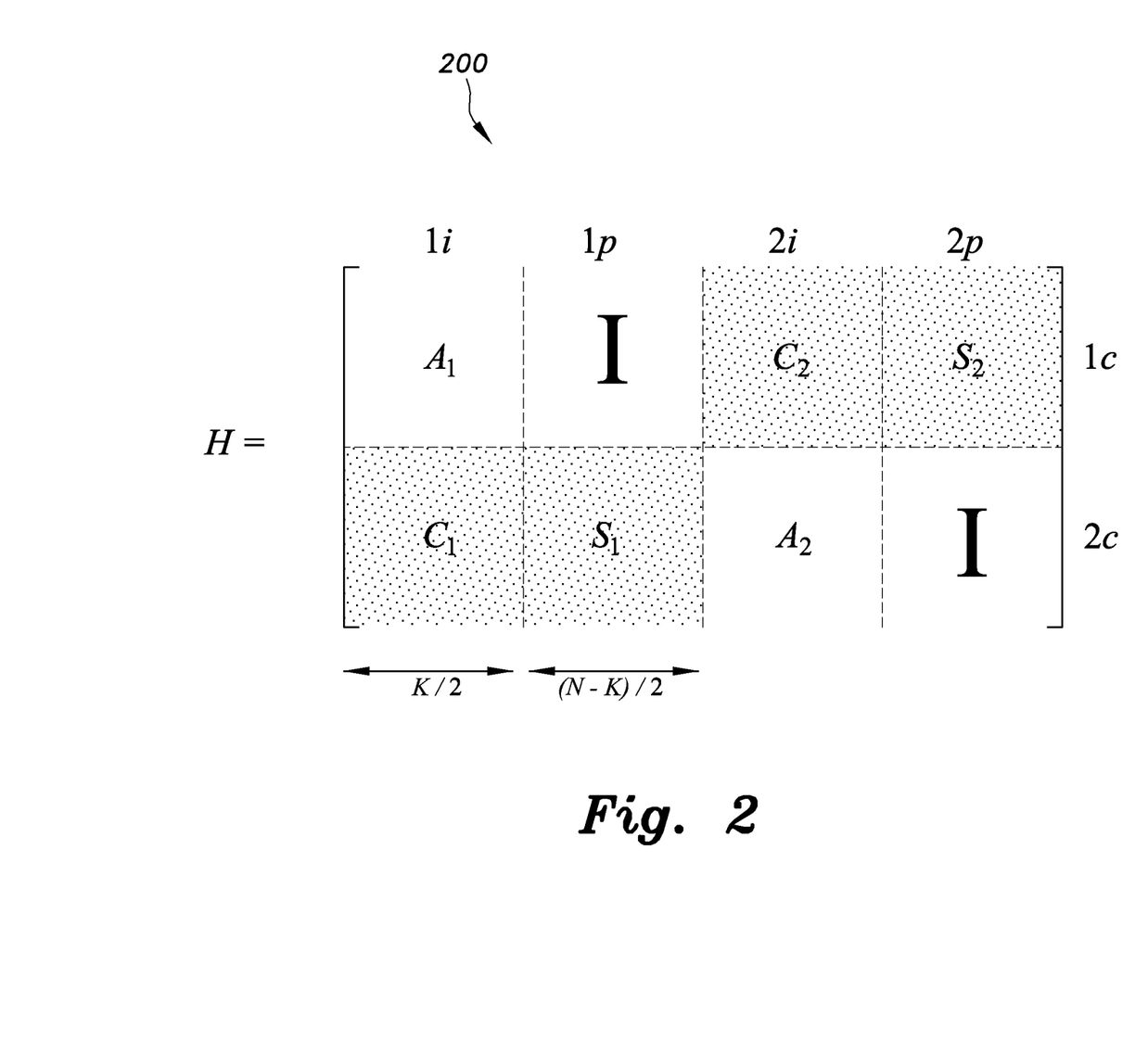
FIG. 2 schematically illustrates an embodiment of a parity-check matrix as an error correction code matrix according to the present invention.

Forcing the equality $C_1 = S_1 A_1$ makes $H_1$ rank deficient, i.e., now the second fundamental rule is violated. Also, the selection of $B_1$ and $B_2$ is not necessarily unique, for example. The general structure of the anti-root LDPC ensemble is shown in FIG. 2, which schematically illustrates an embodiment of a parity-check matrix H as an error correction code matrix in embodiments of an encryption apparatus and method for secure communication. The algebraic security can be proved for a scrambler $S_1$ (resp. $S_2$) of any column and row weight greater than or equal to 1. The parity-check matrix H illustrated in FIG. 2 is a parity-check matrix of an anti-root LDPC code for violating double diversity. The design rate for such matrix H can be, for example, K/N, where $1/2 \leq K/N<1$.

In embodiments of an encryption apparatus and method for secure communication, the system model typically can be symmetric with respect to the LDPC code and to the two-link channel. Thus, the right half part $H_2$ has a structure identical to $H_1$ after switching checknodes $1c$ and $2c$, for example. Thus, $H_2$ has a similar structure (symmetric LDPC ensemble), for example. Further, the expressions of $C_1$ and $C_2$ are maintained for any design rate K/N. Also, algebraic security can be proved for a scrambler $S_1$ (resp. $S_2$) of any column and row weight greater than or equal to 1, for example. The anti-root LDPC ensemble can be defined in embodiments of an encryption apparatus and method for secure communication by its low-density parity-check matrix in FIG. 2, for example, where as in relation (3):

$$C_1 = S_1 A_1 \text{ and } C_2 = S_2 A_2. \tag{3}$$

The anti-root LDPC typically is systematic. Thus, the illegitimate receiver 140 typically should not have direct access to source digits of the secure message. Hence, a source splitter S can be placed between the source, such as a source message M, and the LDPC encoder. The matrix S is K×K, non-singular, and sparse, for example. Where S is regular with degree $d_S$, i.e. the Hamming weight of all rows and columns is $d_S$, then $u=(u_1, u_2, \ldots, u_K) \in \mathbb{F}_2^K$ or $u=(1i, 2i) \in \mathbb{F}_2^K$ can be the LDPC encoder input, for example, where $u=MS^{-1}$, or equivalently $M=uS$ or $M=a_1^K=uS$. The latter typically is an operation that splits each source digit into $d_S$ digits. However, for simplicity of explanation, the source splitter has been restricted to have a degree $d_S=2$, and the row and column weight of S is $d_S=2$, except for one row and one column in S that have a degree equal to 1, for example, and should not be construed in a limiting sense.

In this regard, consider, for example, a quasi-regular weight-2 non-singular splitter S, except for one row and one column whose degree is 1. Then, S is typically equivalent to a double diagonal splitter $S_0$ as in the following relation (4):

$$S = \Pi \cdot S_0 \cdot \Pi', \quad (4)$$

where $\Pi$ and $\Pi'$ are K×K permutation matrices. In the sequel, it can be assumed, for example, that $S=S_0$, and as in relation (5):

$$a_i = u_i + u_{i+1}, \quad (5)$$

for $i=1 \ldots K-1$ and $a_K=u_K$. The last source bit $a_K=u_K$ is Bernoulli(1/2), but unused. Therefore, the exact message entropy is $H(M)=K-1$ bits instead of K, for example.

Figure 3:
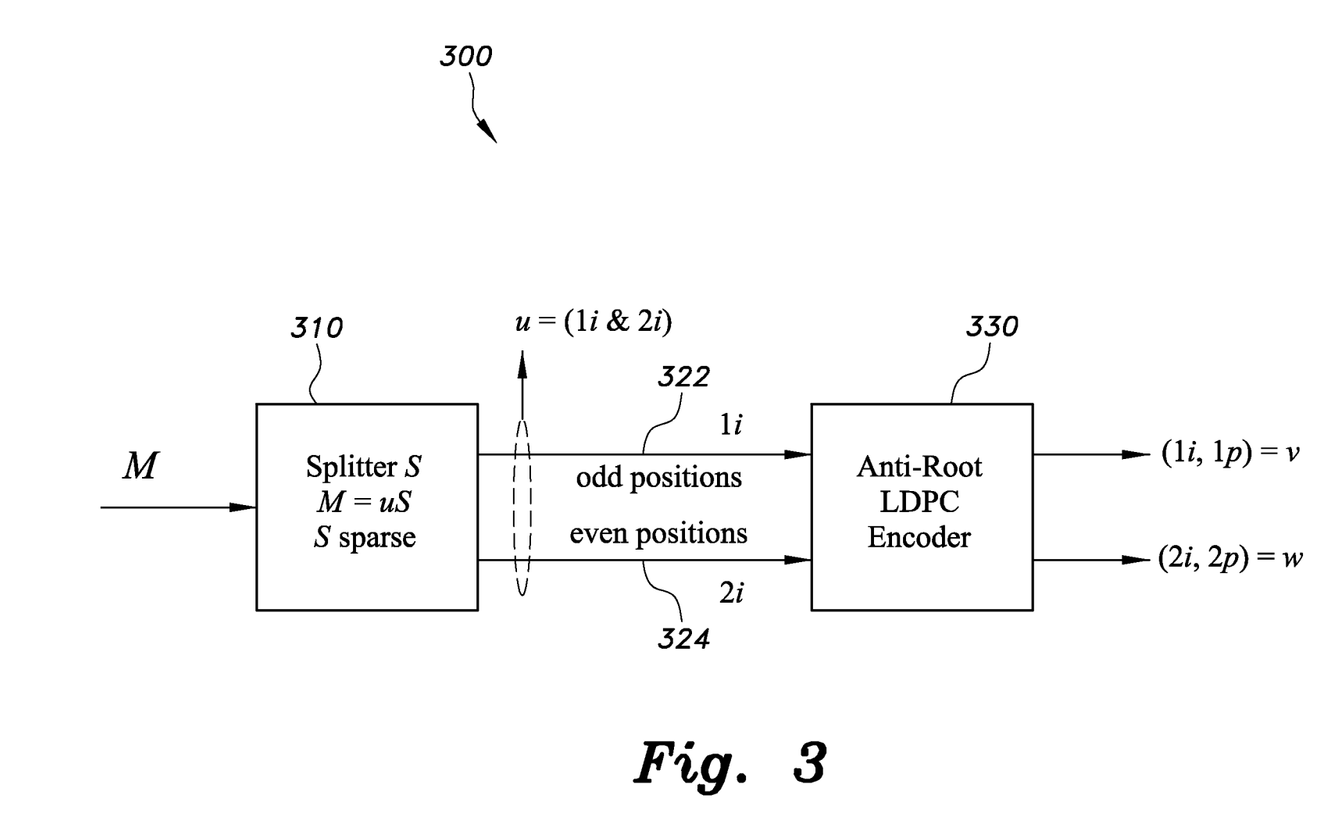
FIG. 3 schematically illustrates a schematic diagram of an embodiment of an encryption apparatus including a non-stochastic splitter and a non-stochastic encoder according to the present invention.

Referring now to FIG. 3, FIG. 3 schematically illustrates a schematic diagram of an embodiment of an encryption apparatus 300 including a non-stochastic splitter 310 and a non-stochastic encoder 330. An exemplary structure of the non-stochastic coding scheme is shown in FIG. 3. The non-stochastic splitter 310 K-bit output u=(1i & 2i) is dispatched from the non-stochastic splitter 310 as odd positions indicated by 322 and as even positions indicated by 324 at the LDPC non-stochastic encoder 330 input, such that the K/2 bits at the odd positions 322 go to 1i and the K/2 bits at even positions 324 go to 2i. The non-stochastic encryption apparatus 300 converts the source message M into half codewords v and w, as indicated in FIG. 3, to be sent on each link of the compound channel, where $M=\in \mathbb{F}_2^K$, v, w $\in \mathbb{F}_2^{N/2}$, for example.

Therefore, with the non-stochastic coding scheme of the encryption apparatus 300, the illegitimate receiver 140 must know both family of bits 1i and 2i in order to find the source message M. Thus, when z=v, the illegitimate receiver 140 knows all bits 1i, but the bits 2i are all missing. The anti-root LDPC does not allow the illegitimate receiver 140 to find any of the missing bits 2i. Similarly, when z=w, the anti-root LDPC does not allow the illegitimate receiver 140 to find 1i. In this regard, the anti-root LDPC ensemble of design rate K/N∈[1/2, 1) can guarantee the relative algebraic security of the communication system, such as implemented in the encryption apparatus 300 between the encoder, such as the encoder 330, or the encoder 110, and the legitimate receiver 140, based on relation (3) and relation (5), as described, for example.

Given the non-stochastic scheme in embodiments of an encryption apparatus and method for secure communication, which is algebraically relatively secure for any block length N, the asymptotic performance of the legitimate receiver 130 for N sufficiently large can also be considered. In this regard, many anti-root LDPC ensembles can be defined, and a given ensemble generally depends on how the submatrices $A_1$, $S_1$, $A_2$ and $S_2$ can be constructed. For purposes of explanation, reference is made in relation to a design rate K/N=1/2 and to $A_1=\Pi_1$ and $A_2=\Pi_2$, where $\Pi_1$ and $\Pi_2$ are uniformly chosen in the set of K/2×K/2 binary permutation matrices, for example, and should not be construed in a limiting sense.

In embodiments of an encryption apparatus and method for secure communication, the asymptotic performance of the legitimate receiver 130 under iterative message passing can be found via density evolution (DE), for example. The anti-root LDPC can be defined by its parity-check matrix H in FIG. 2 and by relation (3) is a multi-edge type code on graphs, for example. Also, an extra difficulty can arise because only the performance on information bits is relevant. Therefore, the following polynomials can be defined to be used by DE at bitnodes and checknodes, for example. The global degree distribution of H from an edge perspective, at bitnodes and checknodes respectively, can be as in following relation (6):

$$\lambda(x) = \sum_{i=2}^{d_b} \lambda_i x^{i-1} \text{ and } \rho(x) = \rho_{j=2}^{d_c} \rho_j x^{j-1}. \quad (6)$$

Moreover, it is assumed that $\rho_j=0$ for j odd. Also, an edge-perspective polynomial $\bar{\lambda}(x)$ when one edge is missing and a node-perspective polynomial $\dot{\lambda}(x)$ can be introduced as in the following relations (7) and (8), respectively:

$$\tilde{\lambda}(x) = \sum_{i=1}^{d_b-1} \tilde{\lambda}_i x^{i-1} = \frac{\bar{d}_b}{\bar{d}_b - 1} \sum_{i=1}^{d_b-1} i \frac{\lambda_{i+1}}{i+1} x^{i-1}, \text{ and} \quad (7)$$

$$\dot{\lambda}(x) = \sum_{i=2}^{d_b} \dot{\lambda}_i x^{i-1} = \bar{d}_b \sum_{i=2}^{d_b} \frac{\lambda_i}{i} x^{i-1}, \quad (8)$$

where $\bar{d}_b$ is the average degree of bitnodes. The polynomials $\tilde{\rho}(x)$ and $\dot{\rho}(x)$ can be defined in a similar manner for checknodes, for example. Finally, two bivariate polynomials are typically necessary due to the separation of a checknode into two parts for information and parity bits on the same side of H as in the following relations (9) and (10), respectively:

$$\dot{\rho}(x, y) = \sum_{j=2}^{d_c} \dot{\rho}_j x^{(j-2)/2} y^{(j-2)/2}, \text{ and} \quad (9)$$

$$\tilde{\rho}(x, y) = \sum_{j=1}^{(d_c-2)/2} \tilde{\rho}_j x^{j-1} y^j = \sum_{j=1}^{(d_c-2)/2} \frac{2j\rho_j}{\bar{d}_c - 2} x^{j-1} y^j. \quad (10)$$

Figure 7:
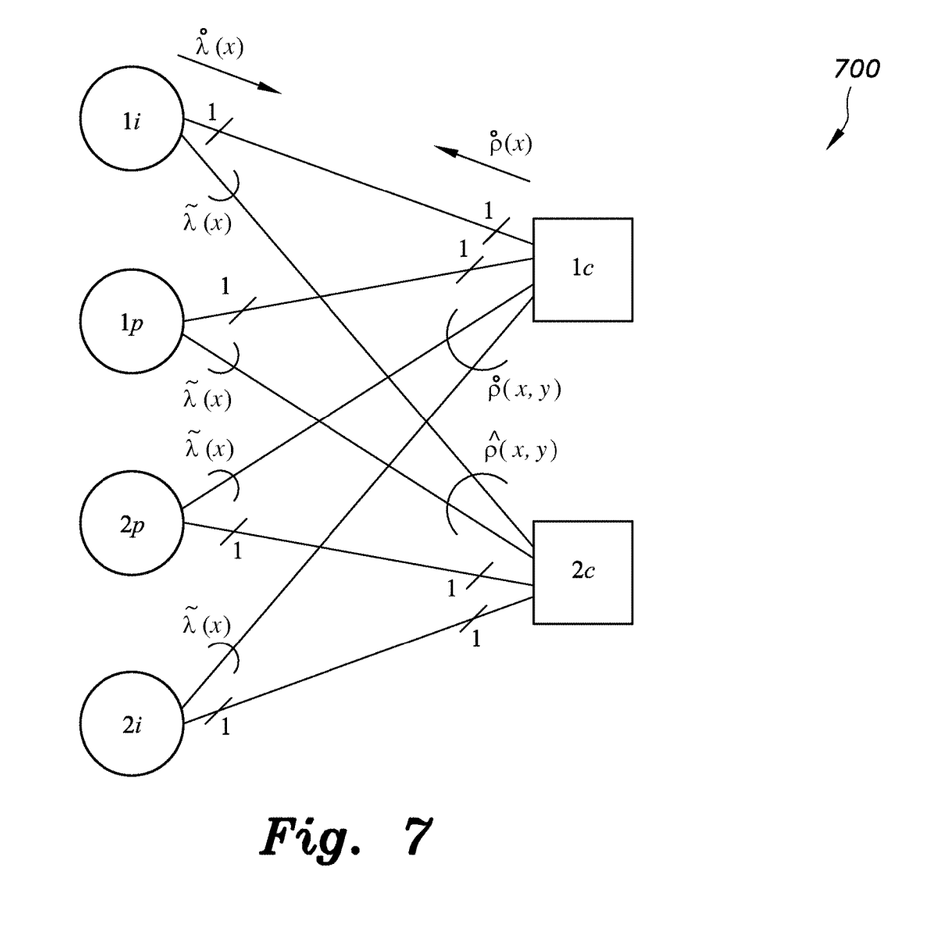
FIG. 7 schematically illustrates density evolution (DE) in relation to a legitimate receiver's performance according to the present invention.

For a general anti-root ensemble with two distinct links in the compound channel, density evolution can involve up to eight message densities. Due to the identical links and to the LDPC code symmetry, DE equations typically can require two densities only: a-f is the probability density function of log-ratio messages from bitnode 1i to checknode 2c, from 1p to 2c, from 2i to 1c, and from 2p to 1c. Also, b-q is the probability density function of log-ratio messages from bitnode 1i to checknode 1c, from 1p to 1c, from 2i to 2c, and from 2p to 2c. In this regard, FIG. 7 schematically illustrates an example of a density evolution (DE) 700 in relation to a legitimate receiver's performance. After drawing the local neighborhood of each type of bitnodes, such as by tree representations, for example, the following DE equations can be found at decoding iteration m+1:

$$q^{m+1} = \mu \otimes \dot{\lambda}(\tilde{\rho}(f^m, f^m) \odot (q^m)^{\odot 2}), \text{ and}$$

$$f^{m+1} = \mu \otimes (q^m \odot \dot{\rho}(f^m, f^m)) \otimes \tilde{\lambda}(\tilde{\rho}(f^m, f^m) \odot (q^m)^{\odot 2}),$$

where $\mu$ is the density at the channel output, and, $\otimes$ and $\odot$ denote convolution at bitnode and checknode levels. For example, considering a rate-1/2 anti-root LDPC ensemble, if the ensemble is regular then DE can be reduced to one equation $f^{m+1} = \mu \otimes \lambda(\rho(f^m))$, i.e., the anti-root LDPC has the same decoding threshold as a regular fully-random LDPC ensemble. In this regard, in the regular case, the constraint in relation (3), as in relation to the structure of parity-check matrix H, did not weaken or substantially weaken the LDPC code. For irregular ensembles, thresholds typically can be optimized by a judicious choice of λ(x) and ρ(x), for example. Also, a further desirable option can include a regular ensemble and spatial coupling, for example.

In summary, a non-stochastic algebraically-secure encoding scheme has been described and its performance analyzed via density evolution in relation to embodiments of encryption apparatus and methods for secure communication. Briefly, in the non-stochastic case, $H(M)=K$ (and $a_K$ can be omitted in order to simplify the notations). The conditional message entropy can be given by:

$$H(M|z=v)=H(1i|z=v)+H(2i|z=v,1i)=H(2i|v).$$

Also, the information leakage between v and $2i$ is typically unknown and can depend on the particular choice of submatrices inside H, and typically can have $0<H(2i|v)\leq K/2$. Similar arguments can be made for $z=w$ and $H(1i|w)$. In this regard, the non-stochastic coding scheme typically satisfies the following relation (11):

$$H(M\mid z)\leq \frac{K}{2} < K = H(M). \qquad (11)$$

However, embodiments of encryption apparatus and methods for secure communication, as described, can also be implemented by a stochastic structure. In the stochastic structure, the algebraic security of the non-stochastic structure is replaced by a stochastic structure that can provide perfect or relatively perfect secrecy in the information-theoretic sense. The stochastic scheme in embodiments of encryption apparatus and methods for secure communication typically sacrifices K/2 bits in the message by reducing the entropy of the message to $H(M)=K/2$ to achieve perfect or relatively perfect secrecy in the information theoretic sense after satisfying $H(M|z)=H(M)=K/2$.

Figure 4:
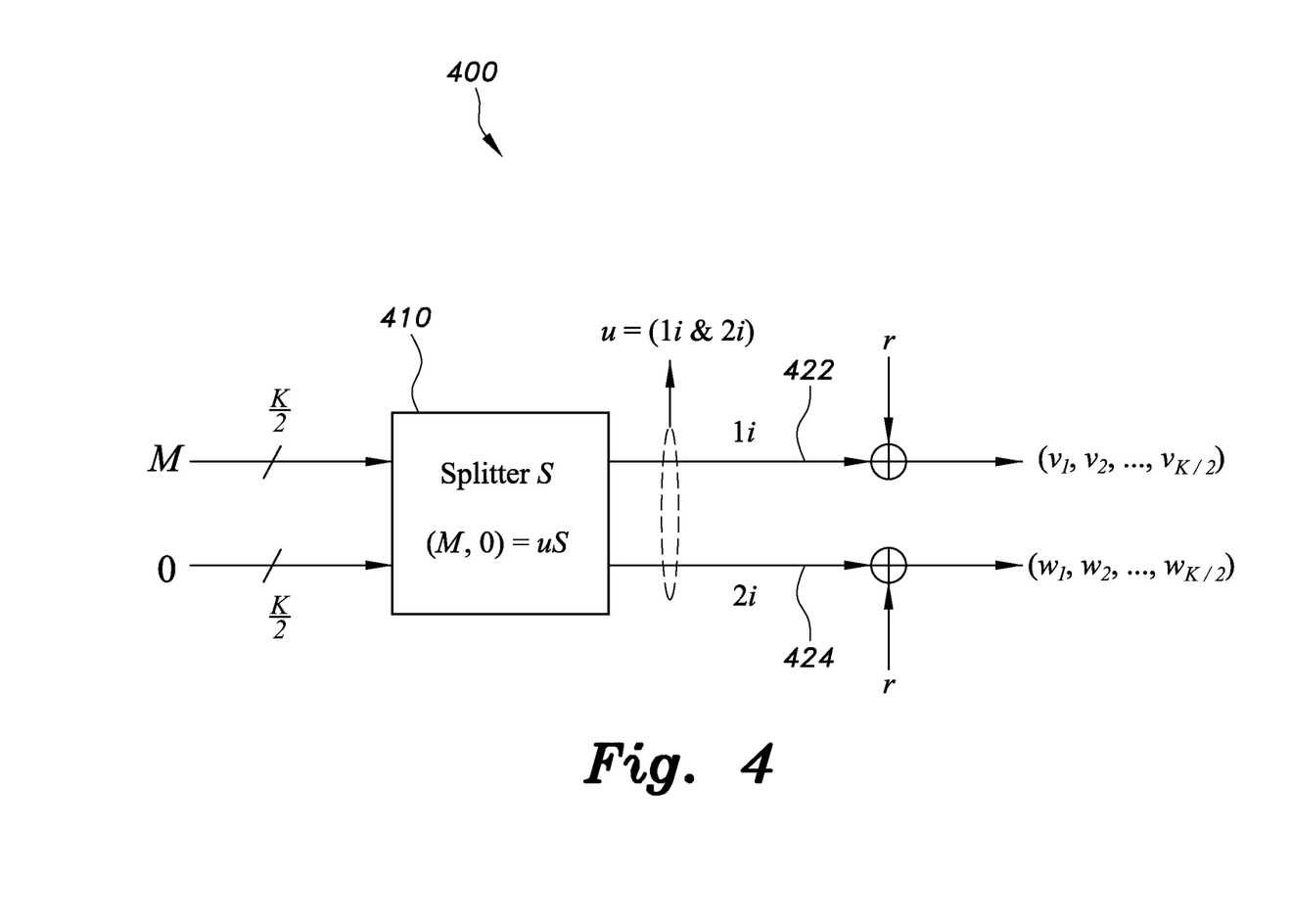
FIG. 4 schematically illustrates a schematic diagram of an embodiment of an encryption apparatus including a K×K stochastic splitter according to the present invention.

Referring now to FIG. 4, there is illustrated a schematic diagram of an embodiment of an encryption apparatus 400 including a K×K stochastic splitter 410. In the encryption apparatus 400, the K×K stochastic splitter 410 in the stochastic scheme illustrated reads a message M of K/2 bits and a zero sequence of K/2 bits, for example. In the encryption apparatus 400, a random sequence of K/2 bits can be applied at the stochastic splitter 410 output before channel transmission, for example.

In this regard, the stochastic splitter 410 input can be modified to include both $M=(a_1, a_2, \ldots, a_{K/2})$ and a zero sequence of length K/2, for example, to provide a plurality of bit sequences at the stochastic splitter 410 output, such as the bit sequences 422 and 424. In the encryption apparatus 400, $r=(r_1, r_2, \ldots, r_{K/2})$ can be a random sequence of K/2 independent uniform binary digits. An r is added to both splitter outputs, as illustrated in FIG. 4, for example. In the stochastic structure of the encryption apparatus 400 shown in FIG. 4, the stochastic splitter 410 output fills K/2 bits in v and K/2 bits in w. The remaining N−K bits in v and w can be equal to parity bits of an LDPC encoder, for example. The analysis for the stochastic structure described herein can be valid for a two-link anti-root LDPC and for two separate length-N/2 LDPC codes, for example.

Figure 5A:
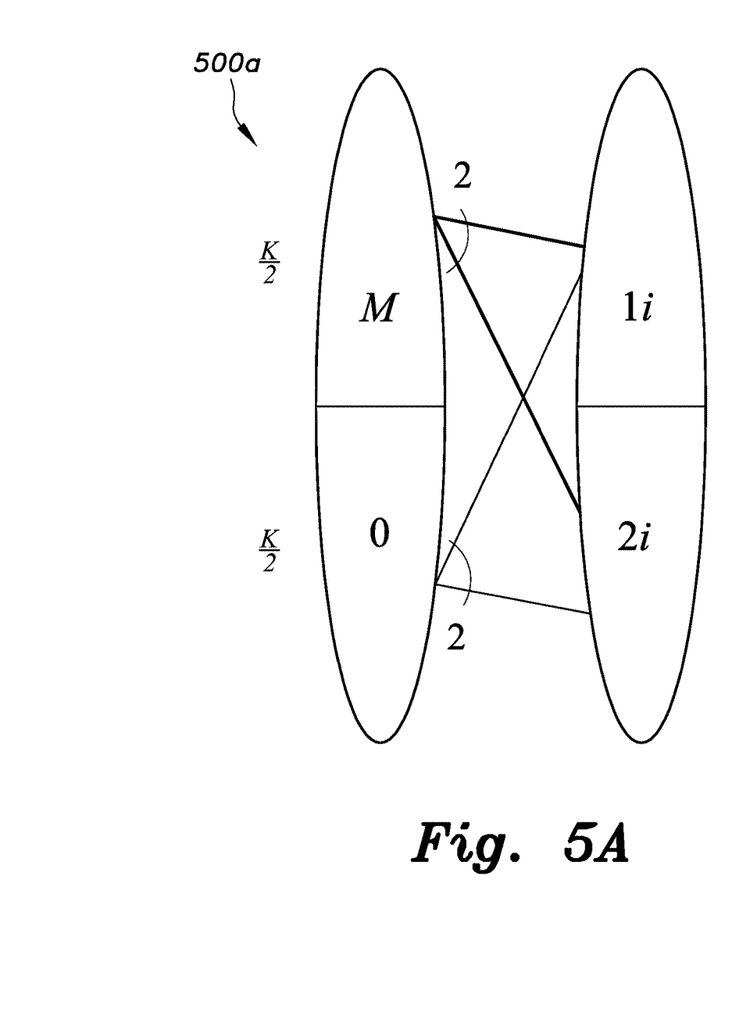
FIG. 5A schematically illustrates a splitter structure for stochastic encoding for two links according to the present invention.
Figure 5B:
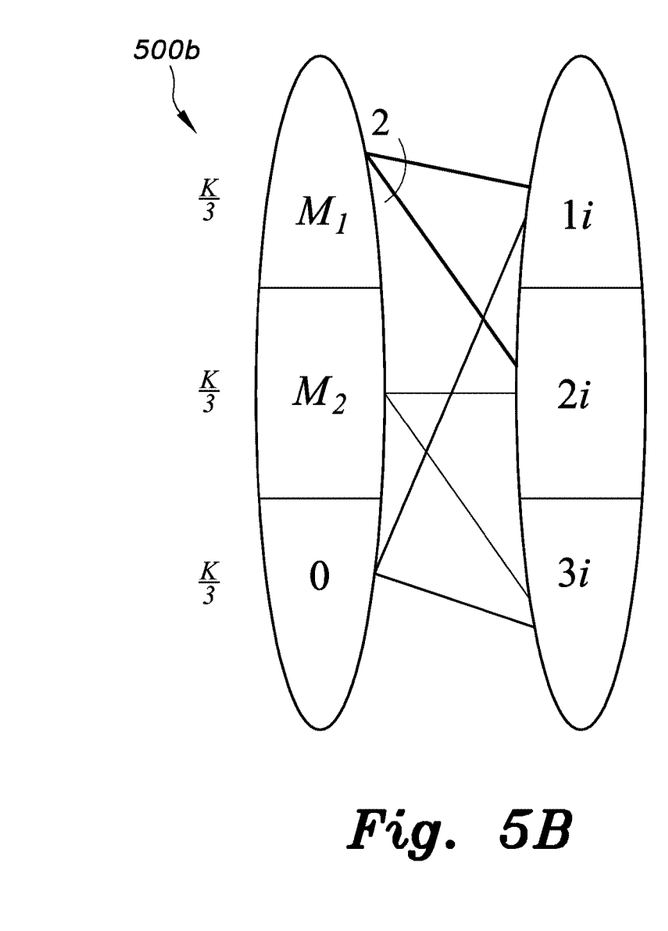
FIG. 5B schematically illustrates a splitter structure for stochastic encoding for three links according to the present invention.

The splitter structure of the stochastic splitter 410 as can be implemented in the encryption apparatus 400 is also illustrated in FIGS. 5A and 5B. FIG. 5A schematically illustrates a splitter structure 500a for stochastic encoding for two links and FIG. 5B schematically illustrates a splitter structure 500b for stochastic encoding for three links. In the splitter structures 500a and 500b, the sparse graph represents the expression (M,0)=uS, where S is sparse with degree 2, for example.

As such, embodiments of an encryption apparatus and method for secure communication can include a source splitter, such as source splitter 410, to divide a message M into a plurality of bit sequences and error correction encoding each of the plurality of bit sequences to generate an error correction code matrix H. The error correction code matrix includes a plurality of portions including submatrices, as described, and a first portion of the error correction code matrix H can correspond to a first signal channel of the plurality of signal channels and the one or more other portions of the correction code matrix H can respectively correspond to the one or more other signal channels of the plurality of signal channels, such as for encoding a plurality of bit sequences corresponding to a plurality of links as can correspond to a plurality of signal channels, such as the two link structure 500a and the three link structure 500b, for example.

Also, as to encoding for a plurality of links, such as two or three links, embodiments of an encryption apparatus and method for secure communication can also apply to and include a non-stochastic source splitter, such non-stochastic splitter 310, to divide a message M into a plurality of bit sequences and error correction encoding each of the plurality of bit sequences to generate an error correction code matrix H. The error correction code matrix in the non-stochastic scheme includes a plurality of portions including submatrices, as described, and a first portion of the error correction code matrix H can correspond to a first signal channel of the plurality of signal channels and the one or more other portions of the correction code matrix H can respectively correspond to the one or more other signal channels of the plurality of signal channels, such as for encoding a plurality of bit sequences corresponding to a plurality of links as can correspond to a plurality of signal channels, for example.

Further, in a relatively straightforward manner, the stochastic encoding scheme yields $H(M|z)=K/2=H(M)$ on a two-link compound channel, i.e., it is perfectly or relatively perfectly secure in the information-theoretic sense and can be generalized to apply to an eavesdropper, such as an illegitimate receiver 140, reading one link out of L links, for any L≥2, such as for a plurality of bit sequences to be encoded and transmitted on or over a corresponding plurality of signal channels, for example.

In support of the stochastic model as discussed and illustrated in relation to FIGS. 4, 5A and 5B, it is to be noted that the zero sequence at the splitter 410 input makes $2i$ a permuted version of $1i$. So $H(2i|z, 1i)=0$. The equivocation therefore is $H(M|z)=H(1i, 2i|z)=H(1i|z)+H(2i|z, 1i)=H(1i|z)$. Considering $z=v$, for the case of two separate length-N/2 codes, then $H(1i|v)=H(1i|1i+r)=H(1i)=K/2$ or $H(1i|v)=H(1i|1i+r)=H(r)=K/2$. Further, for an anti-root LDPC, $H(1i|v)=H(1i|1i+r, 1p)$, with the latter being equal to $H(1i|1i+r)=K/2$ because $1p$ is a function of $1i+r$ in consideration of the splitter. Moreover, a similar supporting case can be made for $z=w$.

Figure 6:
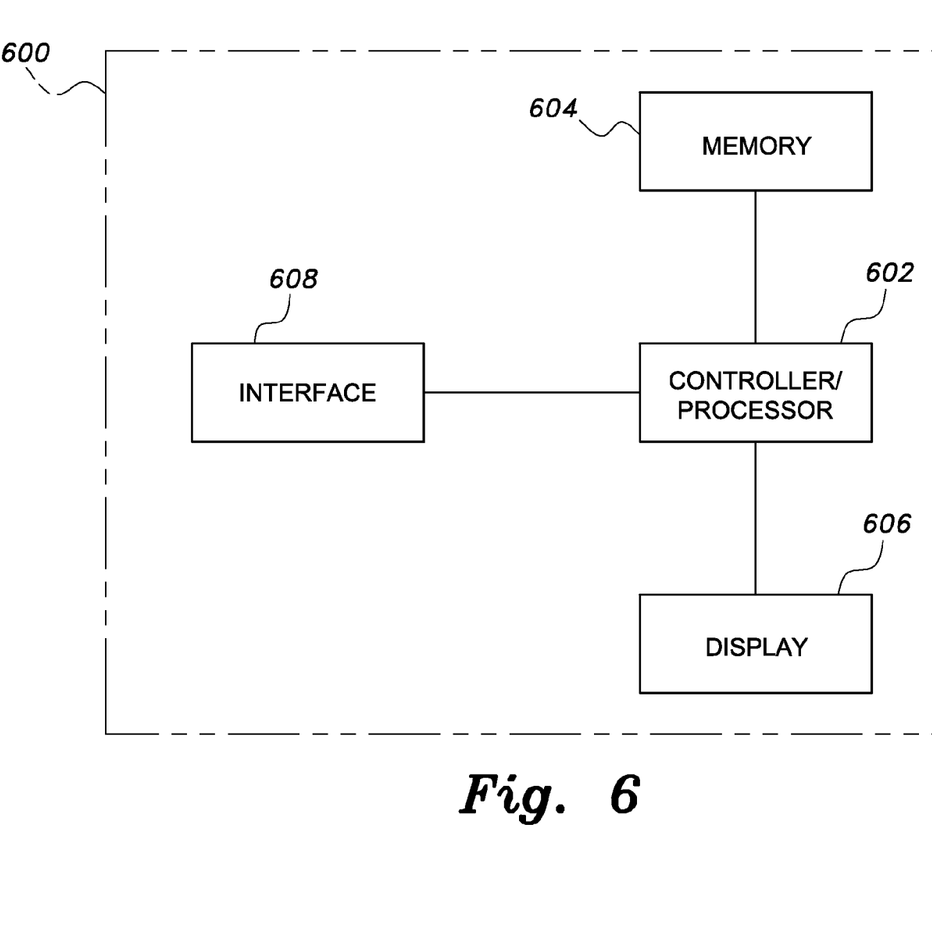
FIG. 6 is a block diagram of a generalized system, including a controller/processor, a memory and an interface, as can be used for implementing embodiments of an encryption apparatus and method for secure communication according to the present invention.

Referring now to FIG. 6 there is illustrated a block diagram of a generalized system 600, including a controller/processor 602, a memory 604, a display 606 and an interface 608, as can be used for implementing embodiments of an encryption apparatus and method for secure communication, although it should be understood that the generalized system 600 can represent, for example, a stand-alone computer, computer terminal, portable computing device, networked computer or computer terminal, networked portable device, or an application specific integrated circuit (ASIC). The system 600, or portions thereof, can be incorporated in the various components of embodiments of encryption apparatus for secure communication, such as encryption apparatus 100, 300 and 400, for example.

Data can be entered into the system 600 by the user or can be received by the system 600, such as to or from the encryption apparatuses 100, 300 and 400 via any suitable type of user or other suitable interface 608, and can be stored in a computer readable memory 604, which can be any suitable type of computer readable and programmable memory. Calculations or operations, such as bit sequencing or encoding operations implementing the stochastic structure and the non-stochastic structure for secure communication, such as described herein, are performed by a controller/processor 602, which can be any suitable type of computer processor, programmable logic controller (PLC) or ASIC, for example, and information and data, such as messages, can be displayed to the user on a display 606, which can be any suitable type of computer display or digital display, for example, such as a liquid crystal display (LCD).

The controller/processor 602 can be associated with, or incorporated into, any suitable type of computing device, for example, a personal computer, a programmable logic controller or ASIC. The display 606, the controller/processor 602, the memory 604, and any associated computer readable media are in communication with one another by any suitable type of data bus, as is well known in the art.

Examples of computer readable media include a magnetic recording apparatus, non-transitory computer readable storage memory, an optical disk, a magneto-optical disk, and/or a semiconductor memory (for example, RAM, ROM, etc.). Examples of magnetic recording apparatus that can be used in addition to memory 604, or in place of memory 604, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Also, embodiments of stochastic and non-stochastic DSP structures for secure communication can be implemented by programming the software of the transmission system. By reprogramming the transmitter and receivers, it can be possible to run the DSP structure for enhanced security and error correction capability. Further, the DSP structure can be included in the transmission standards for public use. Alternatively, a special-purpose device can be produced to operate according to the DSP structure. Such DSP structure can be relatively simple, such as a USB-drive-like device as can enable users to communicate with enhanced security and error correction capability, for example.

As described, embodiments of DSP structures provide coding schemes for secure communication over a two-link compound channel. Embodiments of a non-stochastic scheme can be based on diversity-deficient LDPC ensembles and a source splitter. The anti-root LDPC code can provide perfect or relatively perfect algebraic security. The joint structure can make it twice longer than two separate LDPC codes for each link and can enhance preventing an illegitimate receiver from correcting channel errors when $z=y_1$ or $z=y_2$, for example. On the other hand, embodiments of a stochastic scheme can provide attaining perfect or relatively perfect information-theoretic secrecy and can be built from a splitter with the adjunction of a random sequence, for example.

Therefore, embodiments of encryption apparatuses and methods for secure communication provide stochastic and non-stochastic DSP structures for secure communication of information over a compound channel, as can provide another level of security in the physical layer on top of the existing cryptographic security mechanisms in the application layer. The compound channel can include two parallel links, for example, between a transmitter and a legitimate receiver. The embodiments of encryption apparatuses and methods for secure communication can therefore provide confidentiality when an eavesdropper has access to only one of the two parallel links. Also, the stochastic and non-stochastic DSP structures for secure communication typically require no information about the channel conditions of the eavesdropper and which link the eavesdropper is able to observe between the two parallel links.

As to the stochastic DSP structures for secure communication, the encoding structure can ensure information theoretic security, in that there is no or substantially no information leakage about the original message unless the two parallel links are observed together. Having access to only one of the two links typically does not reveal any information about the confidential message. Also, as to the non-stochastic DSP structures, the encoding structure can ensure algebraic security, in that the individual binary bits of the confidential message can be recovered only when the two parallel links are observed together. Any receiver that has access to only one of the two links typically cannot reveal the individual binary bits of the confidential message.

Thus, in both the stochastic and non-stochastic structures for secure communication, a confidential message can be protected from eavesdroppers that have access to a single link. Moreover, a receiver which receives the noisy channel outputs of both links can recover the original message as a result of the error correction capability of embodiments of the stochastic and non-stochastic encoding structures, for example.

Moreover, embodiments of the DSP structures can provide secure communication on a component channel with two symmetric parallel links when observed by a single eavesdropper. As discussed herein, embodiments of the DSP structures also can have applicability for multiple links and multiple eavesdroppers. Also, asymmetric links can also be considered for the compound channel of the DSP structures.

Embodiments of encryption apparatuses and methods for secure communication can enable secret sharing with error correction capability for perfect or relatively perfect secrecy in the stochastic scheme and error correction capability for algebraic security in the non-stochastic scheme. From one secret message, the encoding structure can generate two messages to be transmitted. Therefore, if an illegitimate receiver, such as a spy, for example, gets one of the two messages, the spy typically cannot recover any useful information about the original message. Since the encoding structure uses an error correcting code, the legitimate receiver, who receives both of the messages, can recover the original message even if the transmitted messages are damaged.

Further, the encoder structure and scheme of embodiments of encryption apparatuses and methods can be used by public users for secure transmission of personal information or by companies and governments for secure transmission of strategic and sensitive information. Many applications require the secure transmission of information, for example.

In this regard, embodiments of encryption apparatuses and methods can ensure perfect or relatively perfect secrecy in the information theoretic sense in the stochastic scheme, and can ensure algebraic security in the non-stochastic scheme by protecting the individual information bits from eavesdroppers, while providing error correction capability for a legitimate receiver.

Information security is a very important issue for the public, companies, and governments. Transmission of sensitive information can raise a risk of the information being intercepted by eavesdroppers. In this regard, embodiments of encryption apparatuses and methods for secure communication can avoid substantial unwanted leakage of information to eavesdroppers. The DSP structures, as described herein, can achieve perfect or relatively perfect secrecy for the transmission of messages between a transmitter and a legitimate receiver for the two-link compound channel, when an eavesdropper can observe only one of the two links, to enable providing secure transmission of messages between a transmitter and a legitimate receiver, for example.

Moreover, embodiments of the encoder structure and encoder scheme can be used to enhance the security of information transmission over a network. In this regard, the transmission between a transmitter and a legitimate receiver can be protected from an eavesdropper in the network. Embodiments of the encoder structure and encoder scheme can be used in wireless fidelity (WiFi) networks, for example, by reprogramming the transmitters and legitimate receivers. Then, the transmitter can use two different frequency bands for the transmission of information. The legitimate receiver, which listens to both frequency bands, can recover the original message even when the transmission is noisy. However, the eavesdropper, such as an illegitimate receiver, which can typically listen to only one of the frequency bands or signal channels, cannot recover any useful information about the original message.

Embodiments of the encryption apparatuses and methods for secure communication, as described herein, relate to methods in secret sharing, such as a secret or confidential message, but the channel model does not necessarily have to include feedback and the design is made to enhance increasing the information rate, rather than finding the worst channel conditions, for example. However, the channel model can also include these features, as well.

It is to be understood that the present invention is not limited to the embodiments described above, but encompasses any and all embodiments within the scope of the following claims.

We claim:

1. An encryption method for secure communication, comprising the steps of:
    dividing a message into first and second bit sequences with a source splitter comprising digital signal processing circuitry or hardware;
    error correction encoding each of the first and second bit sequences to generate an error correction code matrix, wherein a left half of the error correction code matrix corresponds to a first signal channel and a right half of the error correction code matrix corresponds to a second signal channel, wherein an upper left matrix block of the left half of the error correction code matrix is a random permutation matrix, an upper right matrix block of the left half of the error correction code matrix is an identity matrix, a bottom right matrix block of the left half of the error correction code matrix is a random matrix of column and row weight greater than or equal to one, and a bottom left matrix block of the left half of the error correction code matrix is a column permutation of the bottom right random matrix block of the left half of the error correction code matrix, the left half of the error correction code matrix having first and second checknodes;
    switching the first and second checknodes of the left half of the error correction code matrix and generating the right half of the error correction code matrix from the left half of the error correction code matrix following the switching of the first and second checknodes thereof; and
    transmitting the error correction encoded first and second bit sequences respectively over the first and second signal channels.

2. The encryption method for secure communication as recited in claim 1, wherein the source splitter is a stochastic source splitter, such that a zero sequence is applied to the message as the message is input into the stochastic source splitter and a random sequence is mixed with the first and second bit sequences output from the stochastic source splitter.

3. The encryption method for secure communication as recited in claim 1, wherein the source splitter is a stochastic source splitter to divide the message into the first and second bit sequences based on adjunction of a random sequence.

4. The encryption method for secure communication as recited in claim 1, wherein the source splitter is a non-stochastic source splitter to divide the message into the first and second bit sequences.

5. The encryption method for secure communication as recited in claim 1, wherein the source splitter is a non-stochastic source splitter to divide a message into the first and second bit sequences based on a diversity-deficient low-density parity check code (LPDC) scheme.

6. An encryption method for secure communication, comprising the steps of:
    dividing a message into a plurality of bit sequences with a source splitter comprising digital signal processing circuitry or hardware;
    error correction encoding each of the plurality of bit sequences to generate an error correction code matrix, wherein the error correction code matrix includes a plurality of portions comprising submatrices, wherein a first portion of the error correction code matrix corresponds to a first signal channel of a plurality of signal channels and the one or more other portions of the error correction code matrix respectively correspond to the one or more other signal channels of the plurality of signal channels, and wherein an upper left matrix block of the first portion of the error correction code matrix is a random permutation matrix, an upper right matrix block of the first portion of the error correction code matrix is an identity matrix, a bottom right matrix block of the first portion of the error correction code matrix is a random matrix of column and row weight greater than or equal to one, and a bottom left matrix block of the first portion of the error correction code matrix is a column permutation of the bottom right random matrix block of the first portion of the error correction code matrix, the first portion of the error correction code matrix having a plurality of checknodes;
    switching the plurality of checknodes of the first portion of the error correction code matrix and generating the one or more other portions of the error correction code matrix based on the first portion of the error correction code matrix following the switching of the plurality of checknodes thereof; and transmitting the error correction encoded plurality of bit sequences respectively over the corresponding plurality of signal channels.

7. The encryption method for secure communication as recited in claim 6, wherein the plurality of bit sequences is greater than or equal to two and the plurality of signal channels is greater than or equal to two.

8. An encryption apparatus for secure communication, comprising:
a source splitter comprising digital signal processing circuitry or hardware to divide a message into first and second bit sequences; and
an error correction encoder to receive the first and second bit sequences from the source splitter and to apply error correction encoding to each of the first and second bit sequences to generate an error correction code matrix,
wherein a left half of the error correction code matrix corresponds to a first signal channel and a right half of the error correction code matrix corresponds to a second signal channel,
wherein an upper left matrix block of the left half of the error correction code matrix is a random permutation matrix, an upper right matrix block of the left half of the error correction code matrix is an identity matrix, a bottom right matrix block of the left half of the error correction code matrix is a random matrix of column and row weight greater than or equal to one, and a bottom left matrix block of the left half of the error correction code matrix is a column permutation of the bottom right random matrix block of the left half of the error correction code matrix, and the left half of the error correction code matrix having first and second checknodes, and
wherein the error correction encoder switches the first and second checknodes of the left half of the error correction code matrix and generates the right half of the error correction code matrix from the left half of the error correction code matrix following the switching of the first and second checknodes thereof to provide error correction encoded first and second bit sequences to be respectively transmitted over the first and second signal channels to a receiver.

9. The encryption apparatus for secure communication as recited in claim 8, wherein the source splitter is a stochastic source splitter, such that a zero sequence is applied to the message as the message is input into the stochastic source splitter and a random sequence is mixed with the first and second bit sequences output from the stochastic source splitter.

10. The encryption apparatus for secure communication as recited in claim 8, wherein the source splitter is a non-stochastic source splitter to divide the message into the first and second bit sequences based on a diversity-deficient low-density parity check code (LPDC) scheme.

11. An encryption apparatus for secure communication, comprising:
a source splitter comprising digital signal processing circuitry or hardware to divide a message into a plurality of bit sequences; and
an error correction encoder to apply error correction encoding to each of the plurality of bit sequences to generate an error correction code matrix,
wherein the error correction code matrix includes a plurality of portions comprising submatrices,
wherein a first portion of the error correction code matrix corresponds to a first signal channel of a plurality of signal channels and the one or more other portions of the error correction code matrix respectively correspond to the one or more other signal channels of the plurality of signal channels,
wherein an upper left matrix block of the first portion of the error correction code matrix is a random permutation matrix, an upper right matrix block of the first portion of the error correction code matrix is an identity matrix, a bottom right matrix block of the first portion of the error correction code matrix is a random matrix of column and row weight greater than or equal to one, and a bottom left matrix block of the first portion of the error correction code matrix is a column permutation of the bottom right random matrix block of the first portion of the error correction code matrix, the first portion of the error correction code matrix having a plurality of checknodes, and
wherein the error correction encoder switches the plurality of checknodes of the first portion of the error correction code matrix and generates the one or more other portions of the error correction code matrix based on the first portion of the error correction code matrix following the switching of the plurality of checknodes thereof to be respectively transmitted over the corresponding plurality of signal channels.

* * * * *